United States Patent [19]

Kang

[11] Patent Number: 5,083,472
[45] Date of Patent: Jan. 28, 1992

[54] AUTOMATIC OPENING AND/OR CLOSING APPARATUS FOR USE IN A SLIDING DOOR TO AN AUTOMOBILE

[76] Inventor: Ho Y. Kang, 422 Snag Doe Won-Dong, Jung Won-ku, Sung Nam City, Rep. of Korea

[21] Appl. No.: 652,631

[22] Filed: Feb. 8, 1991

[51] Int. Cl.⁵ ............................................. F16H 27/02
[52] U.S. Cl. ................................... 74/89.21; 296/155
[58] Field of Search .................. 74/37, 89.21; 296/155

[56] References Cited

U.S. PATENT DOCUMENTS

| | | | |
|---|---|---|---|
| 2,589,479 | 3/1952 | Curtis | 74/37 |
| 2,653,022 | 9/1953 | Armstrong | 74/37 X |
| 2,860,871 | 11/1958 | Schneider | 74/89.21 |

*Primary Examiner*—Dirk Wright
*Attorney, Agent, or Firm*—Carroll F. Palmer

[57] ABSTRACT

An automatic opening and closing apparatus for use in a sliding door to an automobile, such as a bus used as a means of public transportation, includes a roller chain which is moved by a sprocket gear operated by a reduction gear that is driven by a motor.

1 Claim, 3 Drawing Sheets

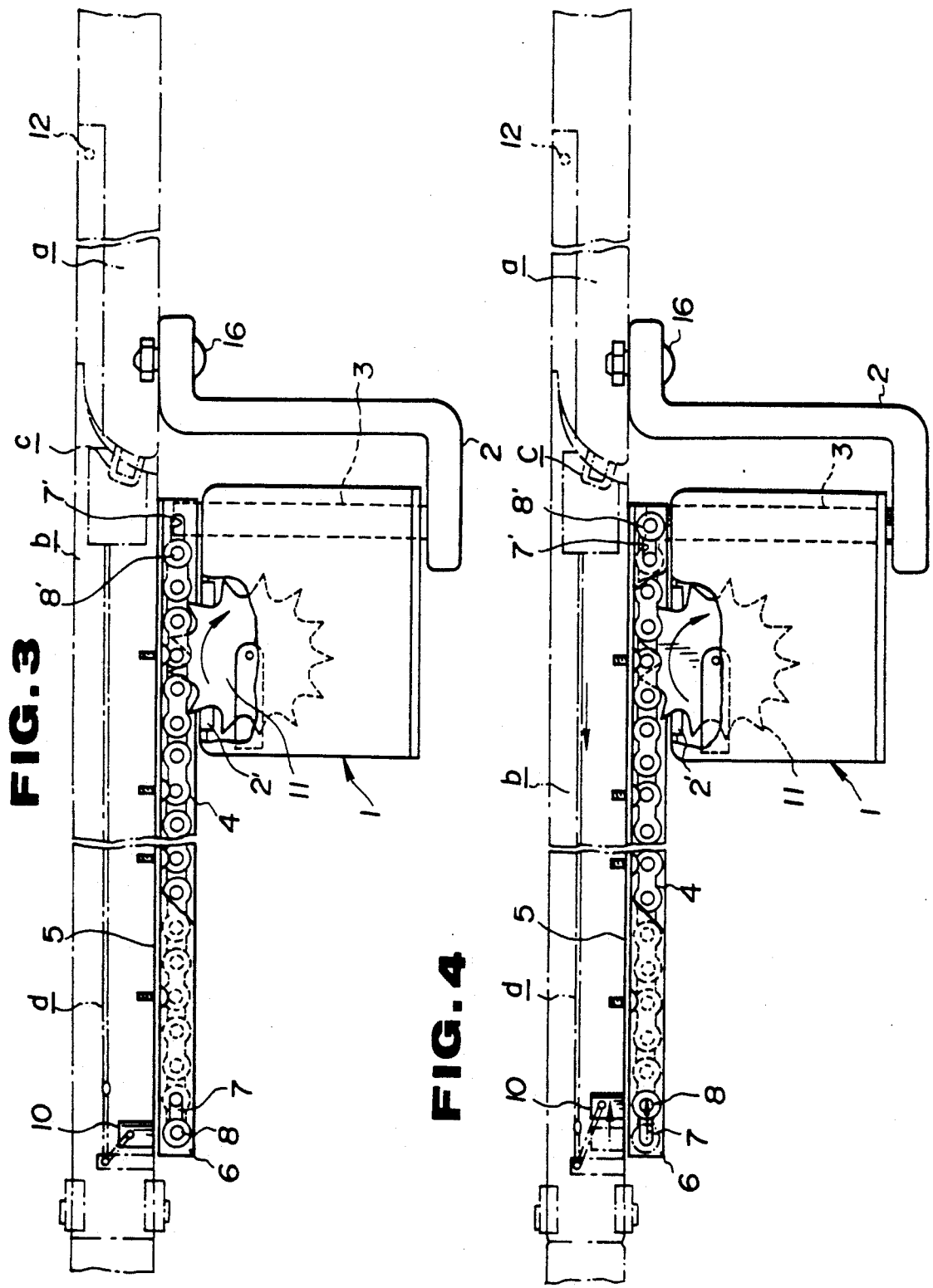

AUTOMATIC OPENING AND/OR CLOSING APPARATUS FOR USE IN A SLIDING DOOR TO AN AUTOMOBILE

BACKGROUND OF THE INVENTION

1. Field of the Invention

This application relates to an automatic opening and/or closing apparatus adapted for use in association with a sliding door to a medium-sized automobile such as a small bus which is used as a means of public transportation.

2. Description of Related Art

Normally, a medium-sized public bus has a manually-operated sliding door. This manually-operated sliding door is very inconvenient for opening and/or closing. Especially, the operation of this manually-operated sliding door is beyond the capacity of most little children. Therefore, a driver himself has to get off the bus and close the door just after the children has got on the bus. Furthermore, there are frequent occasions when the driver has to open the door in advance before the bus stops, which results in an unexpected accident. In addition to these, there is a likelihood that the door would be locked imperfectly, which results in undesired opening of the door of itself while the bus is running.

OBJECTS

A principal object of the invention is the provision of an automatic opening and/or closing apparatus in which the above disadvantages are overcome.

It is another object of the present invention to provide an automatic sliding door which is simple in the operation of the opening and/or closing such that a driver need not leave his seat when it is desired to open and/or close the door.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

According to the present invention, the opening and/or closing operation of the sliding door is achieved by providing a roller chain which is moved by a sprocket gear. The sprocket gear operates by a reduction gear which is driven by a motor.

BRIEF DESCRIPTION OF THE DRAWINGS

A more complete understanding of the invention can be obtained by reference to the accompanying drawings in which:

FIG. 3 is a cross-sectional view showing automatic sliding door of the present invention in the locked position;

FIG. 4 is a cross-sectional view showing a lock in the released position to open the sliding door of the present invention.

DESCRIPTION OF THE PREFERRED EMBODIMENTS

Figure 1:
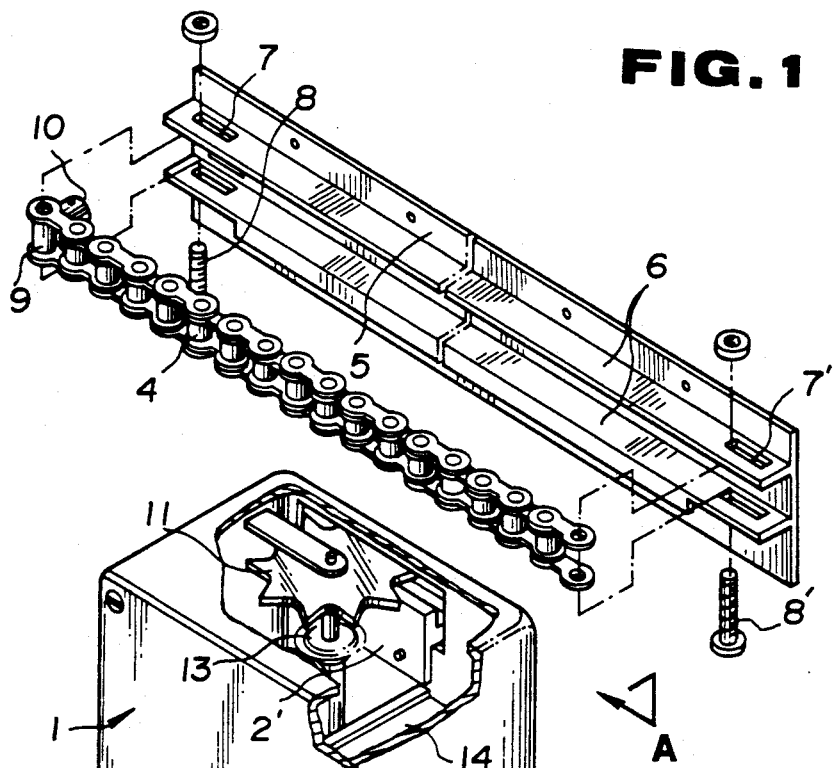
FIG. 1 is an exploded perspective view of a portion of the automatic sliding door of the present invention with partially broken away.
Figure 2:
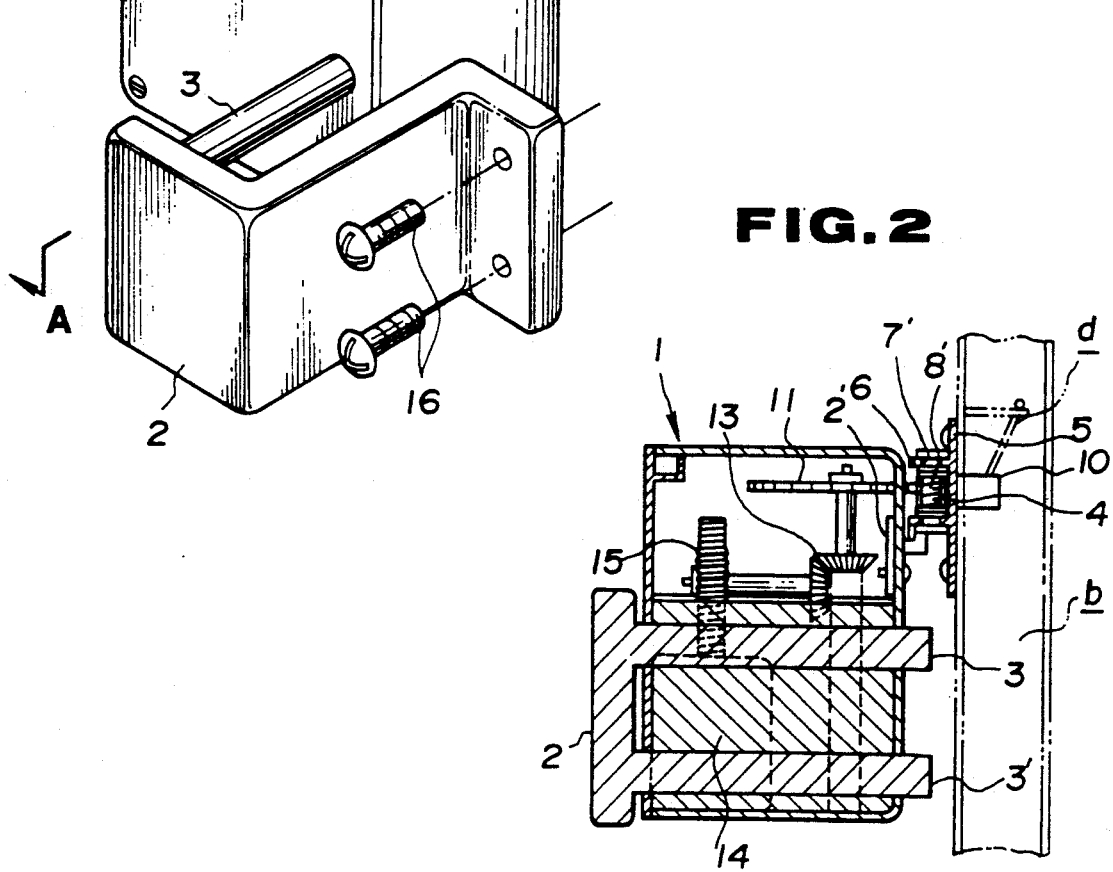
FIG. 2 is a cross-sectional view taken along line A—A showing the assembly of the components.

Referring to the drawings, an electric-powered reducer 1 is supported by a bracket 2 which is fixed to a body (1) of an automobile. The bracket 2 has guide bars 3 and 3' which pass through the electric-powered reducer 1 for mounting the reducer 1 thereon. The reducer 1 engages a receiving member 5 by means of a rail 2'. The receiving member 5 is securely fixed to the inner face of a sliding door (b) and has horizontally extending upper and lower support plates 6 for receiving a roller chain 4 therebetween. Each of the support plates 6 is provided with elongated bores 7 and 7' at each end thereof. The roller chain 4 is moveably mounted between the upper and lower support plates 6 by means of hinge member 8 and 8' and movable in the left-right direction. One hinge member 8 is supported in a bush 9 and has a connection portion 10 to which is connected a wire roped. The wire rope d is connected to a lock C. A sprocket gear 11 is connected to the reducer 1. With this arrangement, the roller chain 4 is moved by the sprocket gear 11 causing the sliding door to be opened.

A numeral 12 denotes a sensing switch; 13, bevel gear; 14, support member; 15, worm gear; and 15, bolts.

Figure 5:
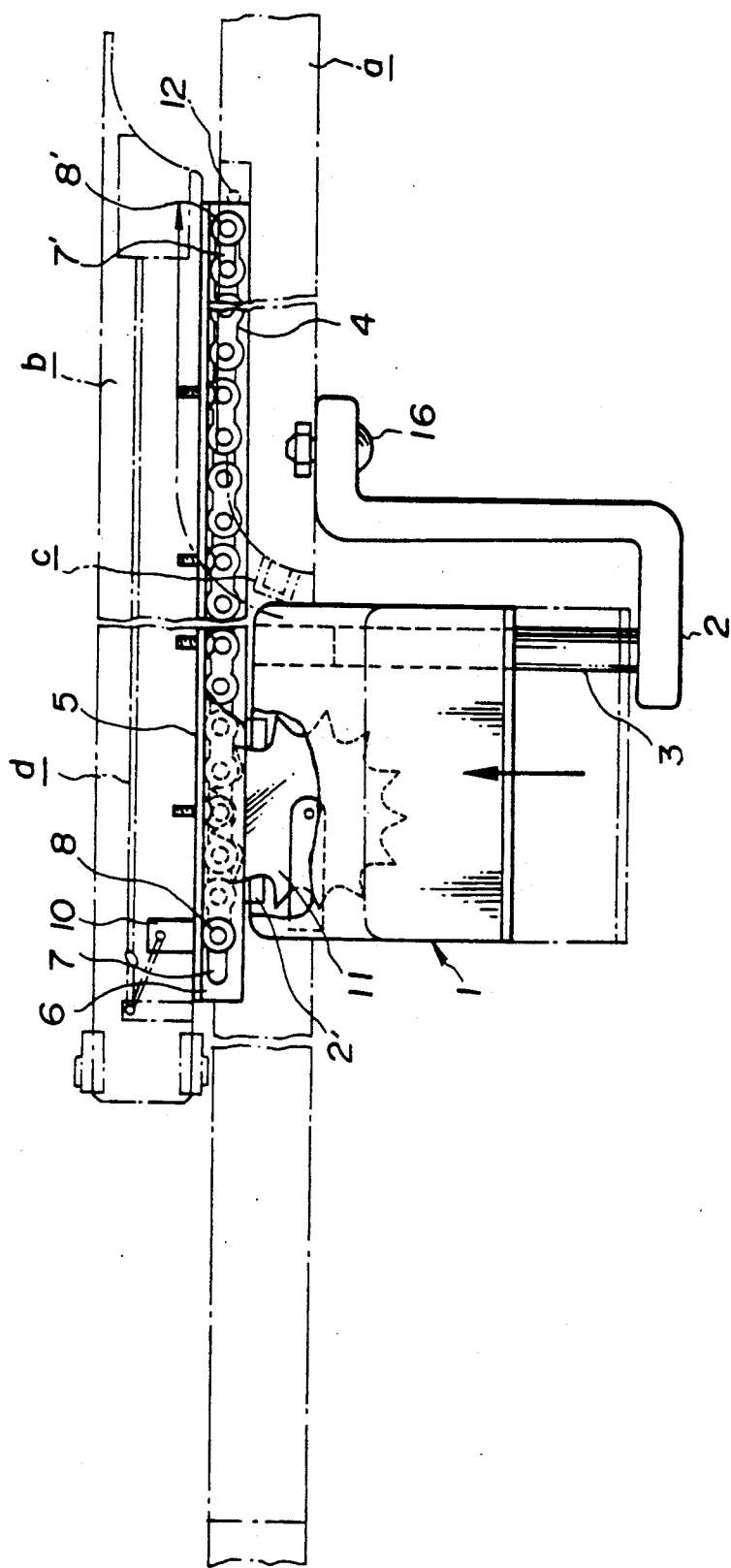
FIG. 5 is a cross-sectional view showing the sliding door of this invention in the open position by means of a chain belt.

In operation (see FIG. 3), a switch or button (not shown) is on with the sliding door closed, to drive the electric-powered reducer 1. With the driving of the electric-powered reducer 1, the sprocket gear 11 rotates clockwise causing the roller chain 4 to move the bush 9 as shown in FIG. 4. Simultaneous with the movement of the bush 9, the connection portion 10 moves while pulling the wire rope d, which results in the release of the lock c. As shown in FIG. 5, after the lock is released, the sprocket rotates continuously, thereby the roller chain 4 moves in the right direction, causing the sliding door to be opened.

The opening operation of the sliding door stops when the switch or button is depressed or one portion of the receiving member contacts the sensing switch 12.

As shown in FIG. 5, the movement of the sliding door toward an outside length L is simply accomplished by moving along the guide bars 3 and 3'. Even in this condition, the sliding door keeps engaging with the receiving member 4 by means of the rail 2' and moves only in the left-right directions.

An extra button (not shown) is provided and the movement of the sliding door from the closed position to the open position is achieved in a reverse manner by simply depressing the extra button. The depression of the button causes the motor of the reducer to rotate in the opposite direction. As the above-described construction, the automatic sliding door of the present invention operates electronically only by means of the buttons and children can get on and/or off the bus with safety. Besides, the automatic sliding door of the present invention is simple and thus, inexpensive to manufacture.

The Embodiments of the Invention in which an Exclusive Property or Privilege is claimed are defined as follows:

1. An automatic opening and closing apparatus for use in a sliding door to an automobile such as a bus used as a means of public transportation comprising;

a bracket fixed to a body of an automobile and having guide bars fixed thereto;

an electric-powered reducer supported by the bracket the guide bars; passing through the electric-powered reducer for moveably mounting the electric-powered reducer thereon;

a rail engaging a receiving member for mounting the electric-powered reducer the receiving member being fixed to the inner side of the sliding door and having horizontally extending upper and lower support members for receiving a roller chain therebetween, each of the horizontally extending support members having elongated openings at both ends thereof;

hinge members for moveably retaining the roller chain between the horizontally extending support plates in the left-right directions, one of the hinge members being supported in a bush which has a connection portion to which a wire rope is connected;

a lock connected to the wire rope;

a sprocket gear connected to the electric-powered reducer, whereby the opening and/or closing operation of the automatic sliding door is achieved by means of the sprocket gear which moves the roller chain from side to side, is connected to the electric-powered reducer.

* * * * *